US008666305B2

(12) United States Patent
Al Qalqili et al.

(10) Patent No.: US 8,666,305 B2
(45) Date of Patent: Mar. 4, 2014

(54) METHOD AND SYSTEM FOR TRANSMITTING AND/OR RECEIVING ADVERTISEMENT AND DATA CONTENTS ON A MOBILE COMMUNICATION DEVICE WITH A DISPLAY MECHANISM

(76) Inventors: Eyad Ali Mohammad Al Qalqili, Sharjah (AE); Basil Nasri Tawfiq Moshataha, Sharjah (AE)

( * ) Notice: Subject to any disclaimer, the term of this patent is extended or adjusted under 35 U.S.C. 154(b) by 392 days.

(21) Appl. No.: 13/027,301

(22) Filed: Feb. 15, 2011

(65) Prior Publication Data

US 2011/0136427 A1 Jun. 9, 2011

Related U.S. Application Data

(60) Provisional application No. 61/424,700, filed on Dec. 20, 2010.

(51) Int. Cl.
*H04H 20/71* (2008.01)
(52) U.S. Cl.
USPC ..... 455/3.01; 455/412.1; 455/557; 455/556.2
(58) Field of Classification Search
USPC .............. 455/412.1, 466, 450, 419, 557, 558, 455/550.1, 3.01, 403, 418, 414.1, 556.2, 455/464, 434, 406–408; 370/328, 329, 341, 370/352
See application file for complete search history.

(56) References Cited

U.S. PATENT DOCUMENTS

| | | | | |
|---|---|---|---|---|
| 6,516,191 B1* | 2/2003 | Greenspan et al. | ........ | 455/412.1 |
| 6,640,097 B2* | 10/2003 | Corrigan et al. | ........... | 455/414.1 |
| 8,036,649 B2* | 10/2011 | Ormson | ........................ | 455/418 |
| 8,340,628 B2* | 12/2012 | Taylor et al. | .............. | 455/404.1 |
| 8,351,581 B2* | 1/2013 | Mikan et al. | ............... | 379/88.14 |
| 8,438,221 B2* | 5/2013 | Wood et al. | .................... | 709/203 |
| 2005/0063242 A1* | 3/2005 | Ren | .............................. | 365/222 |
| 2005/0136884 A1* | 6/2005 | Reidelsturz et al. | .......... | 455/403 |
| 2007/0086359 A1* | 4/2007 | Yaqub | ............................ | 370/254 |
| 2008/0090599 A1* | 4/2008 | Patel et al. | ..................... | 455/466 |
| 2009/0298542 A1* | 12/2009 | Lord | ............................. | 455/558 |
| 2009/0305687 A1* | 12/2009 | Baldan | ........................ | 455/419 |
| 2010/0299702 A1* | 11/2010 | Lo et al. | .......................... | 725/39 |
| 2011/0151898 A1* | 6/2011 | Chandra et al. | ............... | 455/466 |
| 2011/0201365 A1* | 8/2011 | Segura | ......................... | 455/466 |

* cited by examiner

*Primary Examiner* — Sujatha Sharma
(74) *Attorney, Agent, or Firm* — Barry Choobin; Patent 360 LLC

(57) ABSTRACT

The various embodiments herein provide a method and system for advertising on a user screen of a mobile communication device. The method comprising of installing a cell broadcasting system (CBS) application in the mobile communication device, uploading at least one advertisement on a portal, sending the uploaded advertisement to a cell broadcast system and transmitting the uploaded advertisement to the communication device. The CBS application provides for receiving and displaying at least one advertisement on the user screen. The system comprising a cell broadcast manager to receive at least one advertisement from a plurality of cell broadcast entities, a cell broadcast system to store the at least one advertisement, a plurality of base station controllers, a cell broadcast centre to address an appropriate base station controller for processing the requests and one or more base transceiver stations for transmitting the uploaded advertisement to the mobile communication device.

18 Claims, 15 Drawing Sheets

| Name | Home | Business | Personal | Other |

| | |
|---|---|
| Title | Mr |
| First Name | Michael |
| Middle Name | |
| Last Name | Schumacher | Suffix |
| Nick Name | Schumi |
| Email | mic@abc.com |
| IM | ms@xyz.com |

[Update] [Back]

| Mode of Delivery | Content | Devices | Additional Appendages |
|---|---|---|---|
| CBC/GPRS as 2.5G, 2.75G (EDGE), 3G, and 4G etc.. | Image | All Mobile Communication devices available in the market existing and forth coming | (Utilization of CBS Receiver Module). CBS Receiver modules which are commonly embedded in mobile communication devices, can also be embedded or connected (mobile CBS receiver) to any kind of Monitor Screen or output module- thus allowing such mediums to display advertisements and/or Rich Media Content and/or Clips and/or videos- which are sent via CBS and/or GPRS such as 2.5G, 2.75G (EDGE), 3G and 4G. |
| CBC/GPRS as 2.5G, 2.75G (EDGE), 3G, and 4G etc.. | Text | All Mobile Communication devices available in the market existing and forth coming | |
| CBC/GPRS as 2.5G, 2.75G (EDGE), 3G, and 4G etc.. | Video/ Animation | All Mobile Communication devices available in the market existing and forth coming | |

*FIG. 10*

METHOD AND SYSTEM FOR TRANSMITTING AND/OR RECEIVING ADVERTISEMENT AND DATA CONTENTS ON A MOBILE COMMUNICATION DEVICE WITH A DISPLAY MECHANISM

CROSS REFERENCE TO RELATED APPLICATIONS

This application claims the benefit of U.S. Provisional Application Ser. No. 61/424,700, filed Dec. 20, 2010, and International Application No. PCT/EG2010/000002, filed JAN. 1, 2010.

BACKGROUND

1. Technical field

The embodiments herein generally relate to a communication systems and methods and particularly relates to advertising through mobile communication devices. The embodiments herein more particularly relates to a method and system for displaying advertisements on the display screen of the user's mobile communication device and any other Portable/Non Portable Electronic Device with a display mechanism using CBS/CBC or GPRS as a failover Technology.

2. Description of the Related Art

The recent reports on mobile advertising indicate that mobile advertising, as an advertising medium, is becoming a mainstream phenomenon around the world. Nearly 35% of the mobile users in the U.S. got advertisements on their mobile device during the fourth quarter of 2008. Many users who receive the mobile advertisements are likely to respond to the advertisement depending on their age group and other requirements. Analysts have predicted an exponential growth for the advertising medium which has made business owners, both small and large, take notice. As a result, a lot of marketers have decided to spend more on mobile advertising. The report claims that more than 50% of marketers have decided to increase their mobile advertising budgets in the coming months worldwide.

In the field of telecommunications, the mobile devices are increasingly used for more than simple voice and text communication. The mobile devices are now capable of displaying various forms of advertising content including interactive static, animated, video images, audio files, web/WAP (Wireless Access Protocol) pages, or combinations of these forms. The advertisers provide such advertising content, which typically includes a brand name, such as a name of a particular product, service, and/or company. A growing number of advertisers are also providing advertising content that includes a brand name as well as associated content, such as games, short-form video, animation, or consumer marketing material such as surveys, coupons, or promotions.

In today's trend advertising and information sharing has been more than a marginal influence on patterns of sales and production. Technology has supported this in a large way for promoting products and services and to reach customers efficiently. However advertisements and product information very often does not reach customers at the right place and time.

Also the advertising content available through mobile devices is often difficult to be accessed and previewed before downloading or purchasing. Indeed, most advertising content need to be advertised or marketed in some form to the consumer, and listed in a catalog, deck or file for the consumer to access and download. Also, displaying the advertising or marketing information is essential for the distribution of any advertising content intended for the mobile device.

Hence there exists a need for a system and method for enabling the merchants to broadcast the advertisements effectively to reach the intended customers without any time delay. There also exists a need to provide a system and method for enabling the customers to purchase products and services with a minimal effort and to be aware of the available products and services.

The abovementioned shortcomings, disadvantages and problems are addressed herein and which will be understood by reading and studying the following specification.

OBJECTS OF THE EMBODIMENTS

The primary object of the embodiments herein is to provide a method and system for advertising on the main screen of the user's mobile communication device.

Another object of the embodiments herein is to provide a flexible mode of advertising through the display screen of the mobile communication device.

Yet another object of the embodiments herein is to provide a method and system for advertising with an ability to profile network users according to user categories based on sex, age, nationality, and language to advertise the content according to the user defined preferences.

Yet another object of the embodiments herein is to provide a method and system for advertising with an ability to control the advertised contents by minimizing the advertisements to appear on part of the screen.

Yet another object of the embodiments herein is to provide a method and system for advertising with an ability to control transmission of different advertisements at the same time to different geographical locations covered by the network.

Yet another object of the embodiments herein is to provide a method and system for advertising with an ability to control transmission of different advertisements at the same time across the geographical area covered by the network.

These and other objects and advantages of the embodiments herein will become readily apparent from the following detailed description taken in conjunction with the accompanying drawings.

SUMMARY

The various embodiments herein provide a system and method for advertising on a user screen of a mobile communication device using Cell Broadcasting System(CBS) technology. The system comprises of one or more Cell Broadcast Entities (CBE), also termed as advertisers/content providers. The one or more CBE's uploads at least one advertisement on a portal. The CBE's are connected to a Cell Broadcast Center (CBC). The CBC is used locally as well as remotely by independent Content Providers to define and submit Cell Broadcast Messages/Advertisements. The Cell Broadcast Messages are sent to a Cell Broadcast System (CBS). The Cell Broadcast Messages are then transmitted to the communication device wherein transmission shall be Via CBC/CBS or GPRS as a failover as (backup). A CBS application is installed on the communication device for receiving and displaying at least one of the Cell Broadcast Messages on the user screen.

According to one embodiment herein, the uploading of the Cell Broadcast Messages on the portal comprises registering an advertiser with the portal and providing authentication credentials like Login-ID and Password.

According to one embodiment herein, the mobile communication device is at-least one of GSM/CDMA mobile device.

According to one embodiment herein, the uploading of the advertisement is carried out through at least one of a CB media Loader, a CB Media Planner and a CB Media Webpage through a secured network. The said advertisements are interactive. The uploaded advertisements are sorted and saved in a cell broadcast media server of the cell broadcast system.

According to one embodiment herein, the advertisements are displayed in any of the following areas of the user screen of the mobile communication device which includes at least one of covering the complete display screen, covering a portion of the screen, replacing an operator Logo and replacing a background picture. The advertisement on a touch screen mobile communication devices is linked to a hyperlink and further details of the advertisement appears once the advertisement is tapped on the user screen of the mobile communication device.

According to one embodiment herein, the advertisement is sent to a selected users of the network depending on the requirements of at-least one of the user or the advertiser or sent to all the users of the network.

According to one embodiment herein, the method further comprises using a directing means to direct the user to additional information related to an advertisement of interest.

According to one embodiment herein, the advertisements are shuffled based on the predetermined intervals of usage. At least one advertisement is then transmitted through a wireless application protocol link to a mobile communication device.

The embodiments herein further provide a method for advertising on a user screen of a mobile communication device. The method comprising steps of uploading a plurality of advertisements to a cell broadcast media manager with a plurality of cell broadcast entities, sending the uploaded advertisement to a cell broadcast center, addressing an appropriate base station controllers for processing the requests, transmitting the uploaded advertisement from the cell broadcast center to a base transceiver station by the base station controllers and broadcasting the uploaded advertisement to the mobile communication device by the base transceiver stations.

According to one embodiment herein, the cell broadcast entities defines the broadcast areas at-least in geographical terms and abstracting from the topology of a mobile network. The cell broadcast entities also defines the timing and frequency of the cell broadcast message by choosing desired spot from interactive updated booking schedule.

BRIEF DESCRIPTION OF THE DRAWINGS

The other objects, features and advantages will occur to those skilled in the art from the following description of the preferred embodiments herein and the accompanying drawings in which:

FIG. 6 illustrates an advertiser registration window on the portal of the mobile advertising system, according to one embodiment herein.

FIG. 10 illustrates a table showing possible content deliveries through a Cell Broadcast receiver module attached/connected to LCD Monitor Screens and all other applicable output modules.

Figure 1:
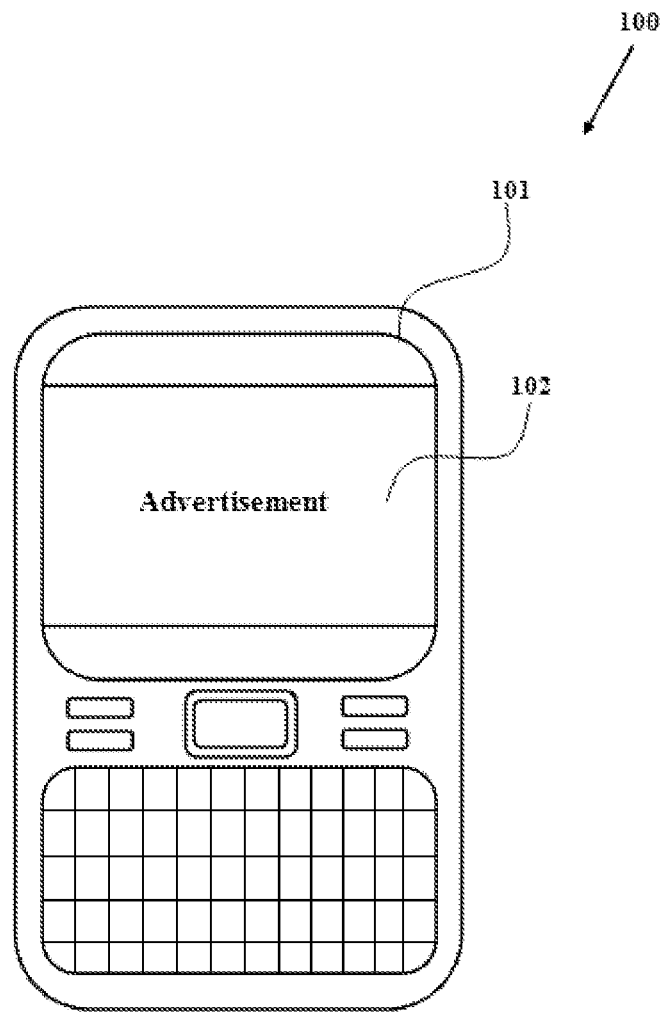
FIG. 1 is an exemplary illustration of a mobile communication device with an advertisement displayed on the user screen, according to one embodiment herein.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for advertising on a user screen of a mobile communication device. The system comprises of one or more Cell Broadcast Entities (CBE), also termed as advertisers/content providers. The one or more CBE's uploads at least one advertisement on a portal. The CBE's are connected to a Cell Broadcast Center (CBC). The CBC is used locally as well as remotely by independent Content Providers to define and submit Cell Broadcast Messages/Advertisements. The Cell Broadcast Messages are sent to a Cell Broadcast System (CBS). The Cell Broadcast Messages are then transmitted to the mobile communication device. A CBS application is installed on the mobile communication device for receiving and displaying at least one of the Cell Broadcast Messages on the user screen.

According to one embodiment herein, the uploading of the Cell Broadcast Messages on the portal comprises registering an advertiser with the portal and providing authentication credentials like Login-ID and Password.

According to one embodiment herein, the communication device is at-least one of GSM/CDMA mobile communication device.

According to one embodiment herein, the uploading of the advertisement is carried out through at least one of a CB media Loader, a CB Media Planner and a CB Media Webpage through a secured network. The said advertisements are interactive. The uploaded advertisements are sorted and saved in a cell broadcast media server of the cell broadcast system.

According to one embodiment herein, the advertisements are displayed in any of the following areas of the user screen of the mobile communication device which includes at least one of covering the complete display screen, covering a portion of the screen, replacing an operator Logo and replacing a background picture. The advertisement on a touch screen mobiles is linked to a hyperlink and further details of the advertisement appears once the advertisement is tapped on the user screen of the mobile communication device. Hyperlinked advertisements once tapped activate GPRS such as 2.5G, 2.7G (EDGE), 3G and 4G and takes the mobile user to a WAP page.

According to one embodiment herein, the advertisement is sent to a selected users of the network depending on the requirements of at-least one of the user or the advertiser or sent to all the users of the network.

According to one embodiment herein the method further comprising using a directing means to direct the user to additional information related to an advertisement of interest.

According to one embodiment herein, the advertisements are shuffled based on the predetermined intervals of usage. At least one advertisement is then transmitted through a wireless application protocol link to a mobile communication device.

The embodiments herein further provide a method for advertising on a user screen of a mobile communication device. The method comprising steps of uploading a plurality of advertisements to a cell broadcast media manager by a plurality of cell broadcast entities, sending the uploaded advertisement to a cell broadcast center, addressing an appropriate base station controllers for processing the requests, transmitting the uploaded advertisement from the cell broadcast center to a base transceiver station by the base station controllers and broadcasting the uploaded advertisement to the mobile communication device by the base transceiver stations.

According to one embodiment herein, the cell broadcast entities defines the broadcast areas at-least in geographical terms and abstracting from the topology of a mobile network. The cell broadcast entities also defines the timing and frequency of the cell broadcast message by choosing desired spot from interactive updated booking schedule.

FIG. 1 is an exemplary illustration of a mobile communication device with an advertisement displayed on the user screen, according to one embodiment herein. FIG. 1 shows a front view of the mobile handset with an advertisement displayed on the display screen. The mode of advertising 102 on the user screen 101 is flexible as the display of the advertisements is customized based on the user-defined preferences. The advertisement as shown in FIG.1 is displayed the user screen 101 of the mobile handset covering the complete screen surface. The advertisements can also be displayed on the user screen 101 in one of the modes including partial coverage of the mobile screen, replacement of the network operator logo with the advertisement and replacing the background image on the mobile screen with the advertisement. The advertisement 102 is shuffled from one advertisement to other at predetermined intervals in accordance with a market or an advertiser targets. The advertisements 102 are also shuffled at predetermined intervals depending on the user preferences.

Figure 2:
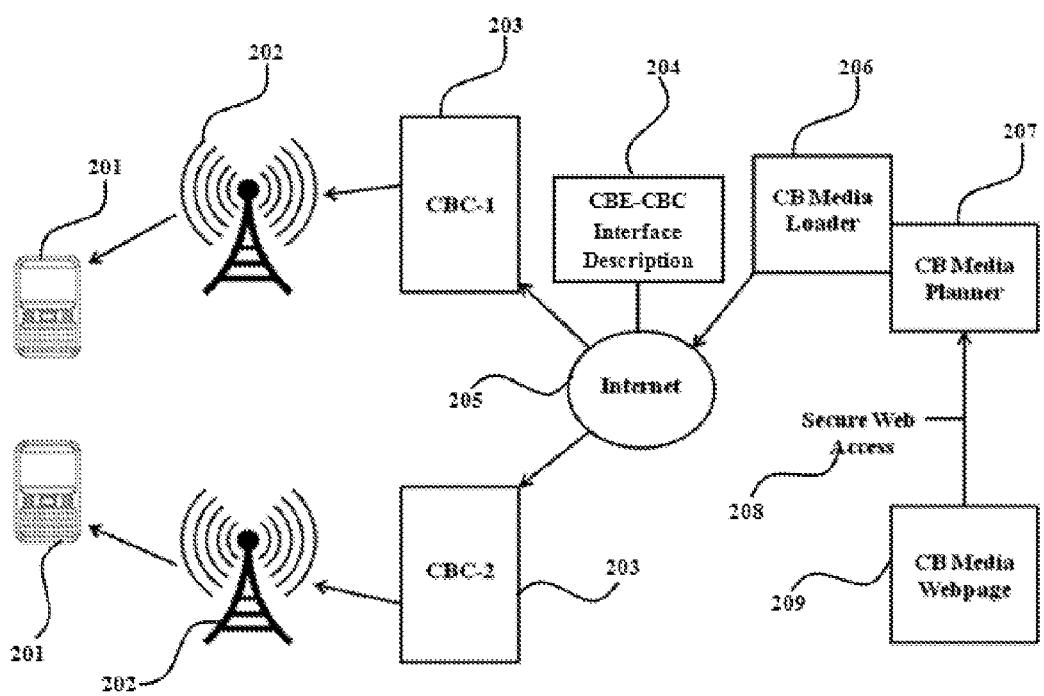
FIG. 2 illustrates a block diagram of the mobile advertising system, according to one embodiment herein.

FIG. 2 illustrates a block diagram of the mobile advertising system, according to one embodiment herein. The advertisements are uploaded from different locations like CB media Loader 206, CB Media Planner 207 and/or CB Media Webpage 209, through a secured web access 208 i.e. with specific ID and password. Once the uploading is completed, the advertisements are pushed from different uploading destinations to the CBS whereas the advertisements are sorted and saved in the CB server. From CBS, the advertisements are sent to the users in any desired form as requested by the advertiser and according to market targets.

Figure 3:
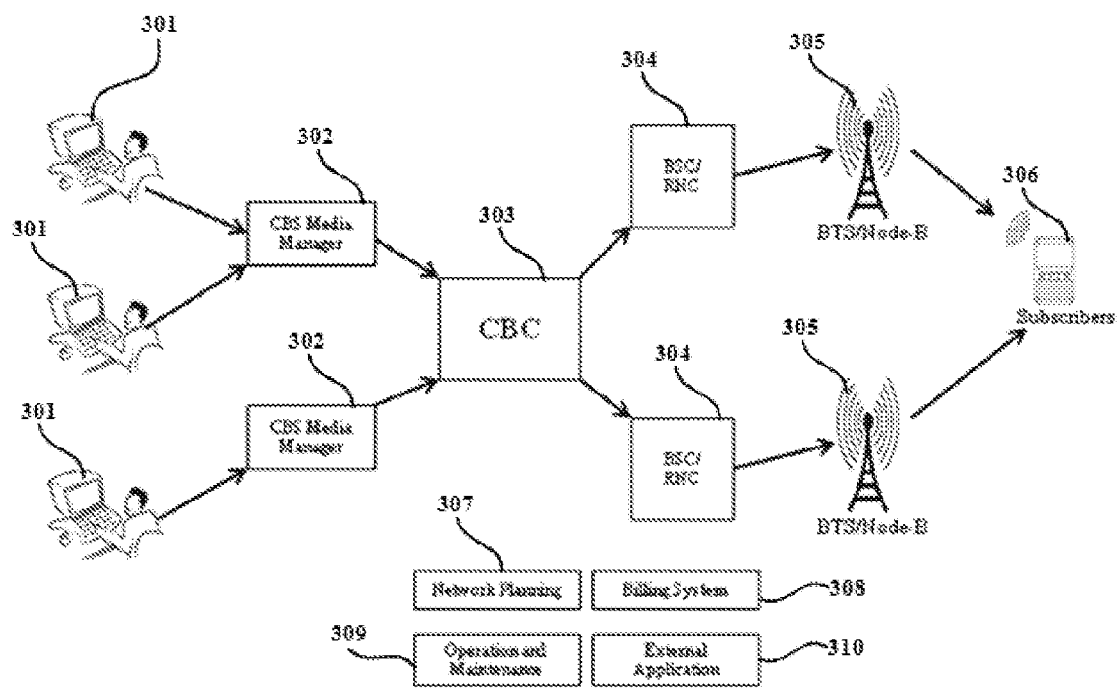
FIG. 3 illustrates a block diagram of the mobile advertising system, according to one embodiment herein.

FIG. 3 illustrates a block diagram of the mobile advertising system,according to one embodiment herein. The mobile advertising system includes one or more Cell Broadcast Entities (CBE) 301 connected to a Cell Broadcast Center (CBC) 303 through a CB media manager 302.The Cell Broadcast Entities (CBE) 301 is used to define and submit Cell Broadcast Messages both locally as well as remotely by independent Content Providers or advertisers. The CBE 301 user defines the broadcast areas in geographical terms, abstracting from the topology of the mobile network. The CBE 301 user also defines the timing and frequency of transmission of the of the CBC 303 message, also termed as advertisement.

The CB media manager 302 aggregates and processes the content data received from all the CBE's 301 or content providers. Then the CB media manager 302 forwards the requests for the CBS to the CBC 303. To execute the commands received from the CB Media Manager 302, the CBC addresses the appropriate Base Station Controllers (BSC) 304. The commands to the BSC 304 are given with a cell-list, identifying the radio cells involved in the command. The requests are processed by the CBC 303 and ETSI 03.41 compliant commands are sent to the BSC 304. As all the BSC 304 is not ETSI compliant, the CBC 303 is equipped with additional interfaces which is adapted to communicate with non-compliant BSC 304. The Cell Broadcast Centre (CBC) 303 holds the relevant information on network topology and geographical location of each radio cell.

The BSC's 304 also provide for transmission of the CBC messages by the Base Transceiver Stations (BTS)/Radio Base Station (RBS) 305 over the air interface to a GSM mobile 306.

The CBC (Cell Broadcasting Centre) 303 is addressed by the content providers using a CMM (CBS Media Manager) 302. The requests are processed by the CBC 303, and ETSI 03.41 compliant commands are sent to the Base Station Controllers (BSC) 304. Not all BSC 304 are ETSI compliant, and therefore the CBC 303 is equipped with additional interfaces including network planners 307, which are able to communicate with non-compliant BSC 304.

The CBC 303 is managed by a web based management system from an Operation and Maintenance Center 309. The CBC 303 also provides billing information regarding the CBS Media Manager 302 requests and actually transmitted messages for the billing system 308. The CBC 303 also develops new applications 310 to add extra functionality to the CBC 303.

The CBE's 301 are connected to the CB Media Manager 302 through a Local Area Network or an Internet. The CB Media Manager 302 offers HTTP/XML based protocol for CBE 301access. The content providers login through the corresponding CBE's301 to upload their content to the CB Media Manager 302. The content provider authenticates with the CBE by providing the User-ID and password when logging into the CB Media Manager.

Each connection to a content provider is provided with a defined time span, when no transmission occurs on a link within the specified time-span the CB Media Manager 302 terminates the connection.

The CB Media Manager 302 is connected to the CBC 303 through the Local Area Network or the Internet. The CBC offers ASN.1 based and HTTP/XML based protocols for assessing the CBE 301. In the CBC 303, throughput regulation is performed on the CB Media Manager-CBC interface. When the CB-Media Manager 302 exceeds a configurable maximum throughput; the CBC 303 slows down the rate of sending the response. This increases the probability of reaching the window size configured per content providers and prevents sending additional requests.

Figure 4:
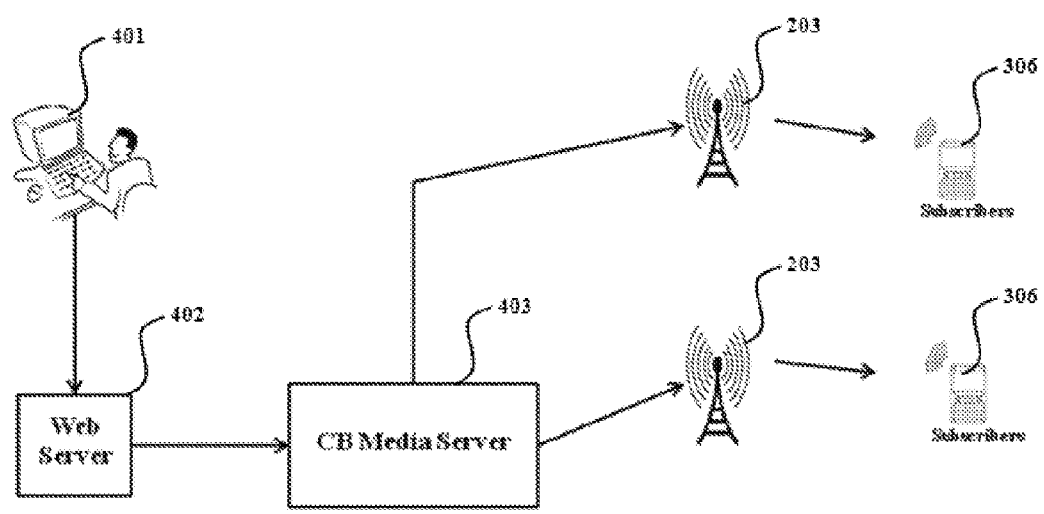
FIG. 4 illustrates a functional block diagram of the mobile advertising system, according to one embodiment herein.

FIG. 4 illustrates a block diagram of the mobile advertising system, according to one embodiment herein. The advertiser login with the user ID and Password and uploads the advertisement from a CB Website 401. The CB Website 401 is connected to the web server 402 through the local area network or the internet. The application in the web server 402 manipulates data by reducing the data to chunks, each chunk containing approximately 1120 bytes of data and approximately 100 bytes of header. For example, commands like play a stored advertisement, delete a stored message is also sent to the CB Media Server 403. The header contains details of the application signature, message-ID (a unique identifier of the message), message type including text, image, ring-tone and the like, message category including advertisement, traffic situation, emergency messages, total number of chunks, size of the current chunk, sequence of the current chunk and the display attributes such as size, position, orientation and the like. The data contains approximately 1120 bytes if it is binary and approximately 1250 bytes of data if the message is broadcasted as text. The data is then sent to the CBC 203 and the CBC 203 broadcasts the data on the air to the cellular service provider.

The mobile advertising system maintains the application signature as a part of the applications header. The CBC application installed on the mobile device identifies the CBC messages based on the application signature. In case the mobile device receives the CBS messages from unintended applications with wrong/invalid signature, the CBC application installed on the mobile device will not process the particular messages. The messages received from the server may reach in a different order from the original order in which the messages are transmitted. In such cases the mobile advertising system uses a mechanism of adding chunk sequence number so that while concatenating the data client application avoids errors. The chunks from different contents do not interfere since the mobile advertisement system maintains a unique ID for each of the chunk sent. As the communication is happening in one way, the chunks for incomplete messages are deleted after waiting for a predetermined time period in case if incomplete data is sent to the client system.

The CBS message is encapsulated and is then encrypted with a symmetric key. The encrypted output is used as a signature. The user is provided with an option to activate or deactivate the channel for receiving CBS messages. For broadcasting of text-messages, binary data is transmitted over a CB-channel. The binary data is encrypted-decrypted for subscribed services. The broadcasted messages are encrypted prior to being communicated to the mobile devices within a geographic area. When the mobile station receives the encrypted broadcast messages, the CBS application in the mobile device retrieves a cryptographic key, which is stored in the communication device to decrypt the message and the information contained in the decrypted message is processed and displayed.

The CB messages are only adapted to be displayed and no information is stored, neither in the SIM nor in the handset, unless the user desires to archive the message. Thus the CB messages are a form of a streaming content.

Figure 5:
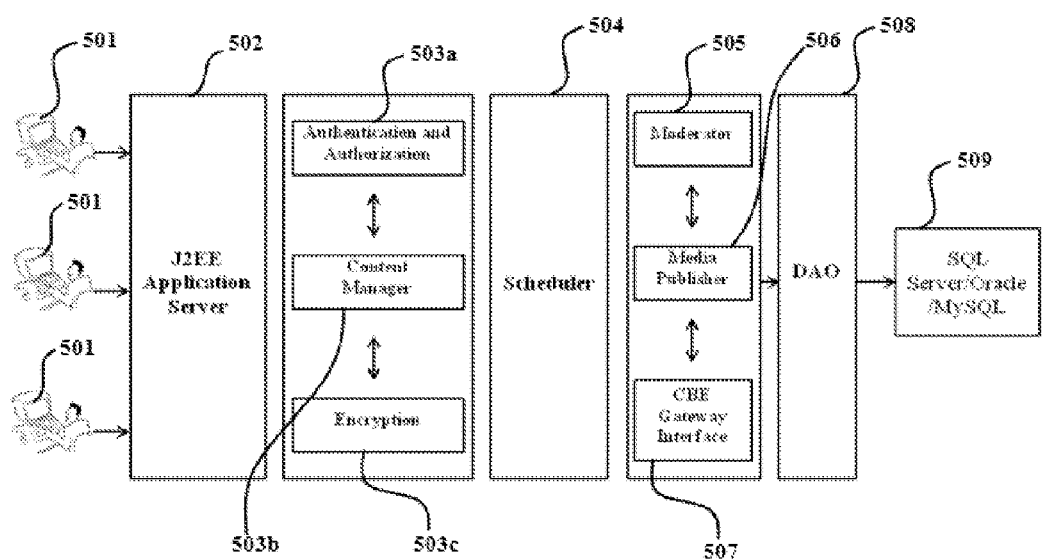
FIG. 5 illustrates a block diagram of a configuration manager/web interface sequence in the mobile advertising system, according to one embodiment herein.

FIG. 5 illustrates a block diagram of configuration manager/web interface sequence of the mobile advertising system, according to one embodiment herein. The configuration manager/web interface enables advertisers who have subscribed for the service to login into the mobile advertising system and schedule and publish the advertisements and messages. The application consists of modules to schedule and upload advertisements and messages, re-schedule and set configuration parameters of the advertisement. The advertiser/web user 501 connects to the CB web server 503 through a J2EE application server 502. A J2EE application server 502 is a software framework dedicated to the efficient execution of procedures (programs, routines, scripts) for supporting the construction of applications. The advertiser/web user 501 is authenticated and authorized 503a with the login ID and password before connecting to the web interface 500. Once the authentication and authorization 503a is done, the advertiser/web user 501 is allowed to upload and schedule advertisements and messages, re-schedule and set configuration parameters of the advertisement. The CB web server 503 consists of a content manager, which reviews and filter-out contents before publishing them. This ensures that no offensive contents with swear words are transmitted to the mobile device.

The uploaded advertisement and message is then encrypted with the encryption 503c algorithm. The scheduler module 504 allows the advertiser/web user 501 to schedule the advertisement, re-schedule the scheduled advertisement and set configuration parameters of the advertisement. The moderator 505 module modulates the entire process of scheduling, uploading advertisements and messages, re-scheduling and setting configuration parameters of the advertisement and allows the administrator to review and filter-out contents before publishing. Once the administrator reviews the uploaded advertisements and messages, the media publisher 506 publishes the advertisements. The scheduler 504 module then processes the messages based on the schedule set by the advertiser/web user 501 and the administrator and sends the data to a CBE Gateway Interface 507. The CBE Gateway Interface 507 broadcasts the message to the corresponding Cell broadcasting entity (CBE). The Data Access Objects (DAO) 508 is a general programming interface for accessing the SQL server database 509. The data access object (DAO) 508 provides an abstract interface to the SQL server database509 for specific operations without exposing details of the SQL server database 509.

The advertisers/web user 501 use the configuration manager to set parameters for the advertisement such as managing files (memory management) on the device, playing schedule, image position, orientation, size and the like, which forms the header for the message. The expiry of the content is also as part of header for removing the file after receiving or after a certain period of time unless the subscriber wishes to store the message.

The configuration manager also allows the users to upload images and allows to type in text messages. While uploading the application, based on the mode of display such as banner, full screen and the like, the server resizes the image into a pre-defined format, which does not make any distortion on different screen resolutions in mobile end while viewing. The administrator of the configuration manager/web interface has the privilege to use the configuration and schedule modules. The administrator enrolls the advertisers/web users 501 and set privileges according to the preferences, uploads the content (Images/video, audio, text messages, and choose the area for message broadcasting. The user is selected from one or more ways including identifying the Cell ID from a list, using maps, by entering the geographical coordinates and the like. The administrator also has the privilege for the maintaining the cell management module such as cells location creation, and to reject or filter the added advertisement according to the country rules and regulations with prior coordination with the content provider Similarly, the advertiser/web user 501 can upload the content or post messages in the mobile advertisement system taking in consideration the agreed rules and restrictions, schedule and configure advertisement and uploaded messages.

FIG. 6 illustrates an advertiser registration window on the portal of the mobile advertising system, according to one embodiment herein. The advertiser fills in the boxes with the necessary details provided in the advertiser registration window 601 on the portal of the mobile advertising system. Once the details of the advertiser are updated in the portal, the advertiser is provided with authenticationcredentials including a login ID and password. The advertiser can also define the authentication credentials according to their preferences. Once the advertiser is authenticated, the advertisers are allowed to upload and schedule the advertisements and messages.

Figure 7:
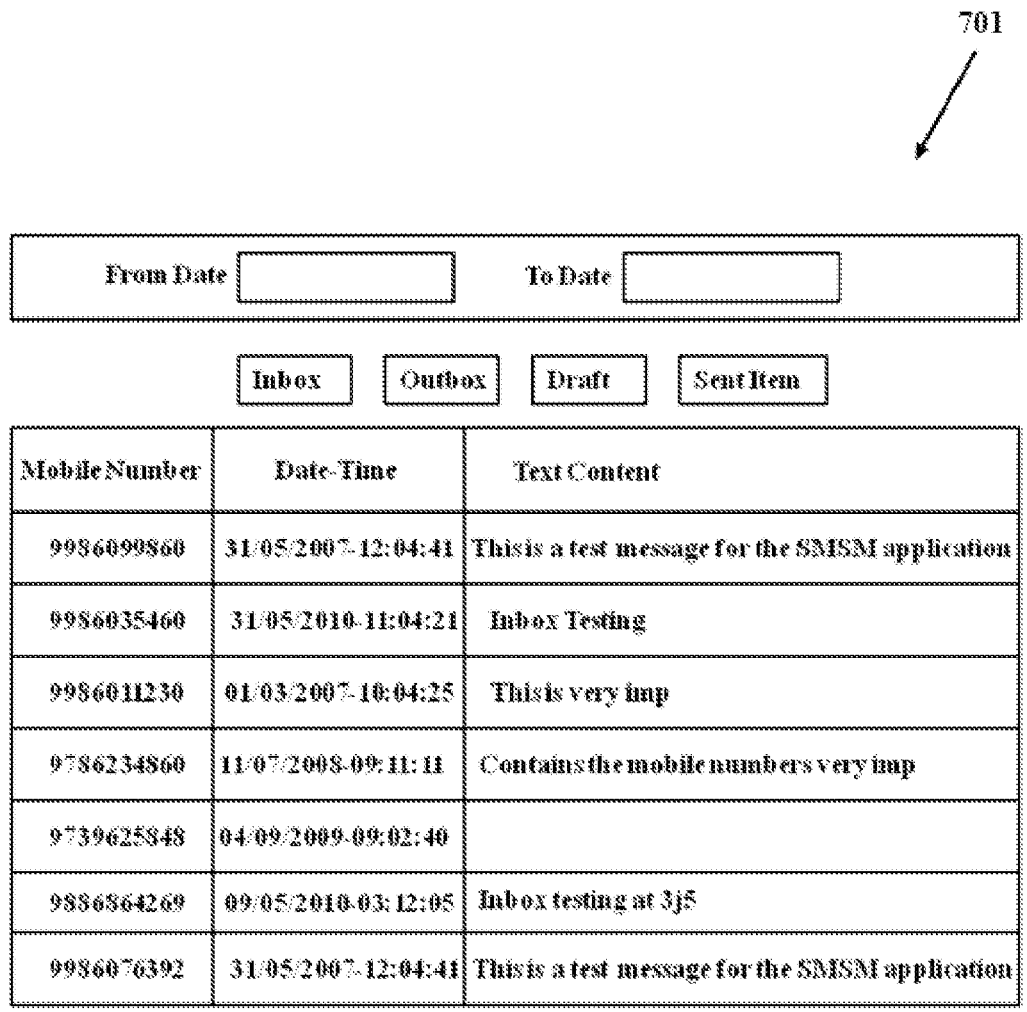
FIG. 7 illustrates a cell broadcast media server's ad-publisher window for consolidating the advertisements and transmitting the relevant advertisements and messages to the users, according to one embodiment herein.

FIG. 7 illustrates a cell broadcast media server's advertisement-publisher window for consolidating the advertisements and transmitting the relevant advertisements and messages to the mobile communication devices, according to one embodiment herein. The broadcast media server's advertisement-publisher window 701 allows the advertiser to schedule and upload advertisements and messages, re-schedule and set configuration parameters for the advertisement. The scheduler 504 module as shown in FIG. 5 then processes the data based on the schedule set by the advertiser/web user and the administrator and sends the data to a CBE Gateway Interface. The moderator module modulates the entire process of scheduling, uploading advertisements and messages, re-scheduling and setting configuration parameters of the advertisement and allows the administrator to review and filter-out contents before publishing them. Once the administrator reviews the advertisements, the media publisher publishes the advertisement and messages according to the configuration parameters set by the advertiser.

Figure 8:
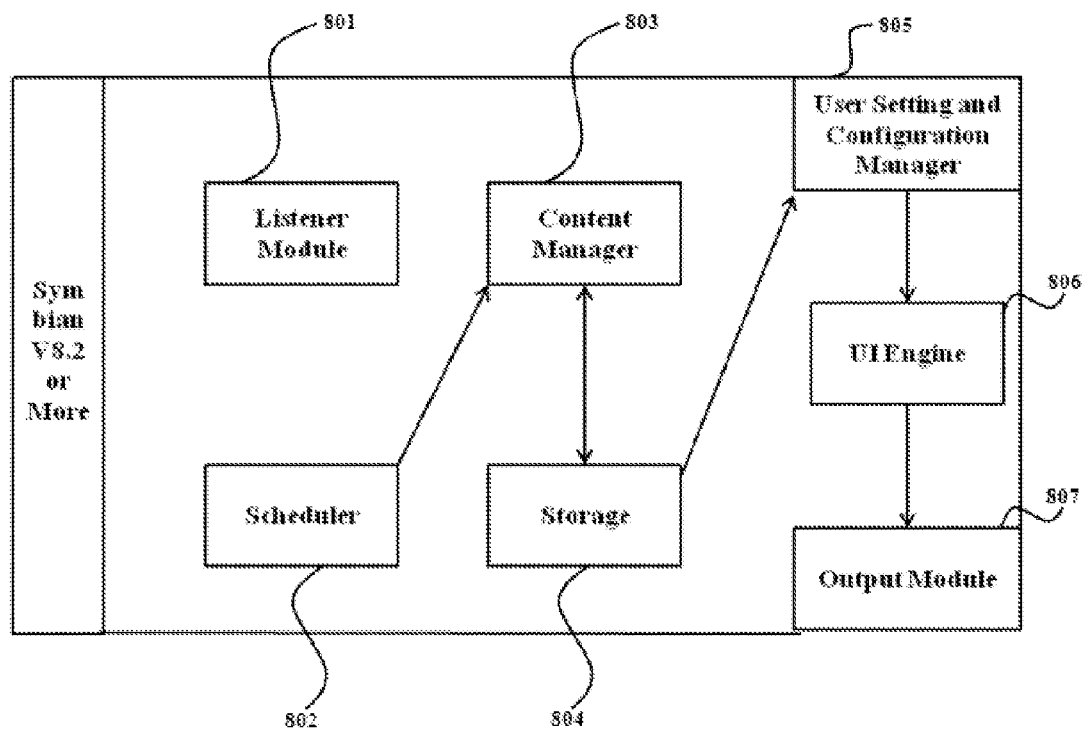
FIG. 8 illustrates a block diagram system for advertising on the mobile main screen, according to one embodiment herein.

FIG. 8 illustrates a block diagram of the method and system for advertising on the mobile main screen, according to one embodiment herein. The listener module client 801 runs at the background on the mobile communication device, for instance a mobile device, to listen a specified port number. Whenever a new message is received, the listener module client 801 invokes the content manager's (803) main method. The scheduler 802 invokes the content manager 803 at periodical intervals and the content manager 803 displays the stored messages if they have to be displayed on a schedule. The content manager 803 decodes/merges the message to its original format according to the user defined protocol and stores the message on to a storage device. The storage area is a multimedia card (MMC), and data is stored in 2d file in a format: CBS Received: <users define protocol><data >.

The storage area 804 is split into two portions, where the first portion is a permanent storage area and the second portion is a temporary storage area. The data that has to be kept for a defined period of time in the device's memory is stored in the permanent area. The data stored in the temporary storage area will be displayed immediately and will be deleted automatically after the user views the message.

The content is compressed and encoded before sending to the mobile device. The mobile device receives the advertisements and messages as bits and pieces as the contents may be more than the specified length/chunks, as the advertisement may be large in size. The data received is decoded and merged before the data is stored in the storage area 804.

The messages are generally identified by content-id. The content-id is same for all chunks. After receiving all the chunks of the data, the content manager 803 stores the data in file system database and invokes the configure manager 805. This in turn displays the advertisements and messages. A user settings and the configuration manager 805 stores a protocol, a message index, a message type and a TTL (Time to live) in a local module. According to that, the configuration manager sends an instruction to a UI engine 806 about what to display, where to display and which data to be stored and deleted. The UI engine 806 formats the message as per the UI Configuration, the mobile device compatibilities and screen resolutions, and displays the output through the output module 807.

The size of the CBC application installed on the user's mobile device is less than 50 KB, since no static image or text has been used by the CBC application. The CBC application selects either the phone memory or external memory to store the content and images received. The usage of memory is purely dependent on the content and duration the message needs to be broadcasted.

The mobile device users are provided with configuration options for the application including:
  a) deactivating the CBC application where the CBC application does not run at all, and does not receive any messages;
  b) categorizing the messages such as emergency messages, traffic alerts, general advertisements and filters are set based on the message categories using keywords;
  c) setting ringtone according to the message type;
  d) setting image size of the message, where if the image size of the message is maximum then the width is 128 due to secondary screen resolution and if the screen size is more than the available image size then the message would be displayed with a plain background without stretching the image;
  e) defining the volume of data that can be stored on the phone;
  f) storing the data as per the unique Message ID sent by the server such that there is over writing of data;
  g) updating an account to LRU (least recently used);
  h) updating according to command sent from the server (expire content, delete advertisement);
  i) deleting old data which are least used by the CBC application, in case of memory full;
  j) alternatively using GPRS, such as 2.5G, 2.75G (EDGE), 3G, and 4G and the like for quick delivery of content to the mobile station (MS) if for any reason cell broadcasting center (CBC) is busy, time consuming or down so that works as a backup.

Figure 9A:
FIG. 9A-9F illustrates a step-by-step installation of the CBS application, according to one embodiment herein.

FIG. 9A-9F illustrates the step-by-step installation of the CBS application, according to one embodiment herein. The cell broadcasting system (CBS) application URL is sent via a configuration message to the mobile device. The configuration message contains information which establishes and downloads the application from a remote server. The details include name and web address [URL]. The installation wizard opens when the installation starts in the mobile device. In the first step 901, the security warning stating the application is un-trusted message pops as shown in FIG. 9A. If the mobile device user selects "Yes" the application proceeds to the next installation step. If the user selects "No" the installation stops.

Figure 9B:
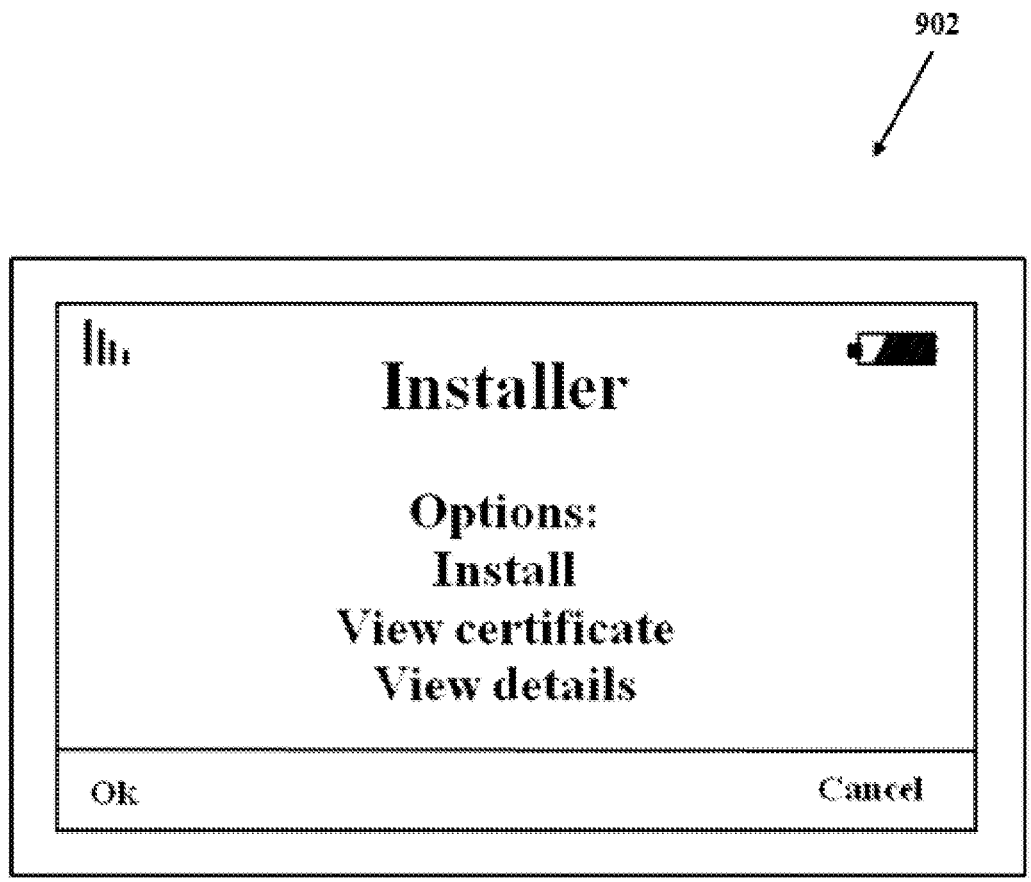

In the second step 902 of the installation, the mobile device user is provided with three options as shown in FIG. 9B. Install—for continuing the installation procedure, view certificate—includes the version number, the certificate and the application developer details and view details—includes the details like size of the CBC application, receiving time and date, application format etc. upon selecting the option install, the CBC application leads to the next step.

Figure 9C:
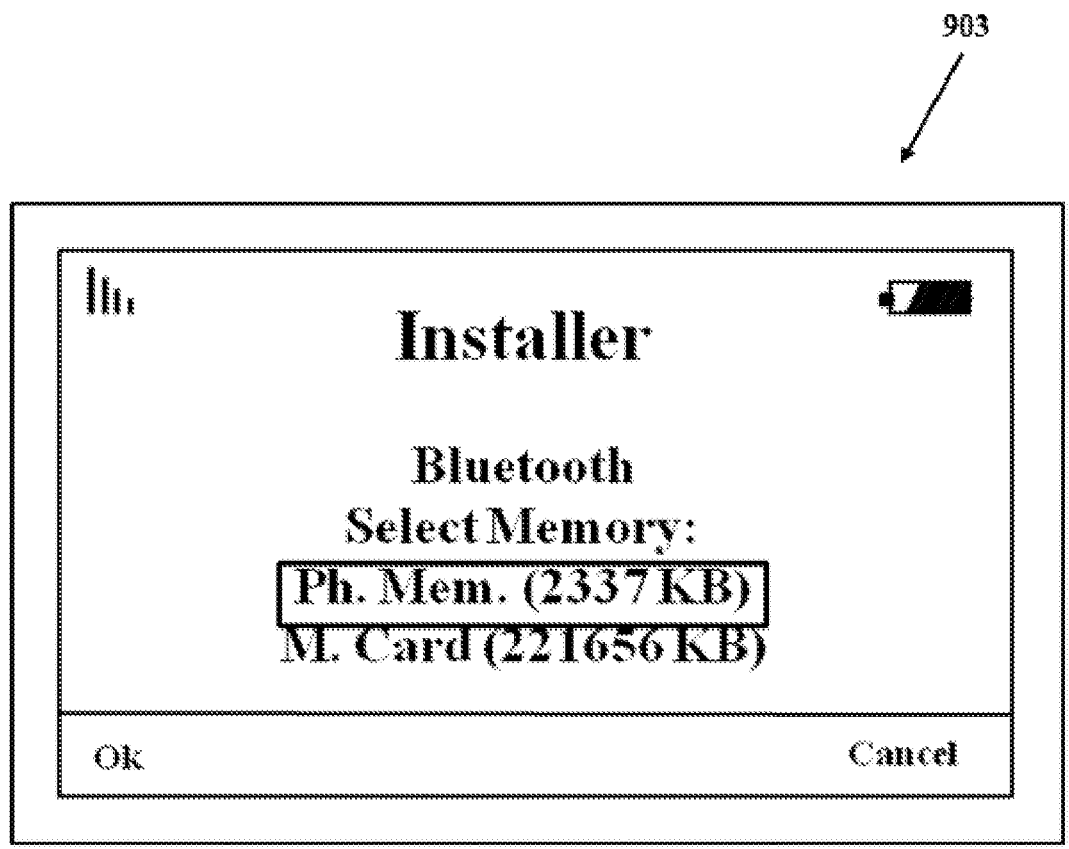

In the third step 903, the mobile device user has to select the storage area to install the application as shown in FIG. 9C. The storage area consists of phone memory and the multimedia card. A free space of the phone memory and the multimedia card are also displayed on the mobile screen. The user can select either of the storage area to install the CBC application depending upon the free space. After selecting the storage area, the CBC application leads to the next step.

Figure 9D:
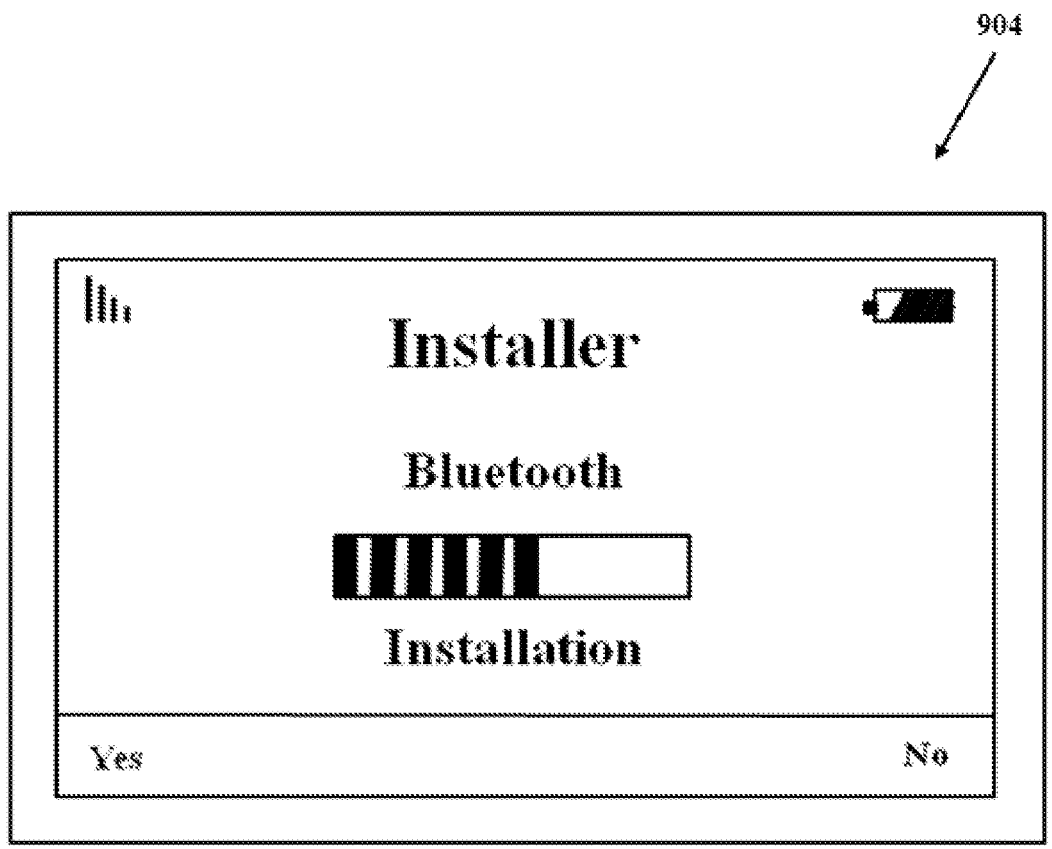

In the fourth step 904, the installation progress is displayed on the mobile device screen as shown in FIG. 9D.

Figure 9E:
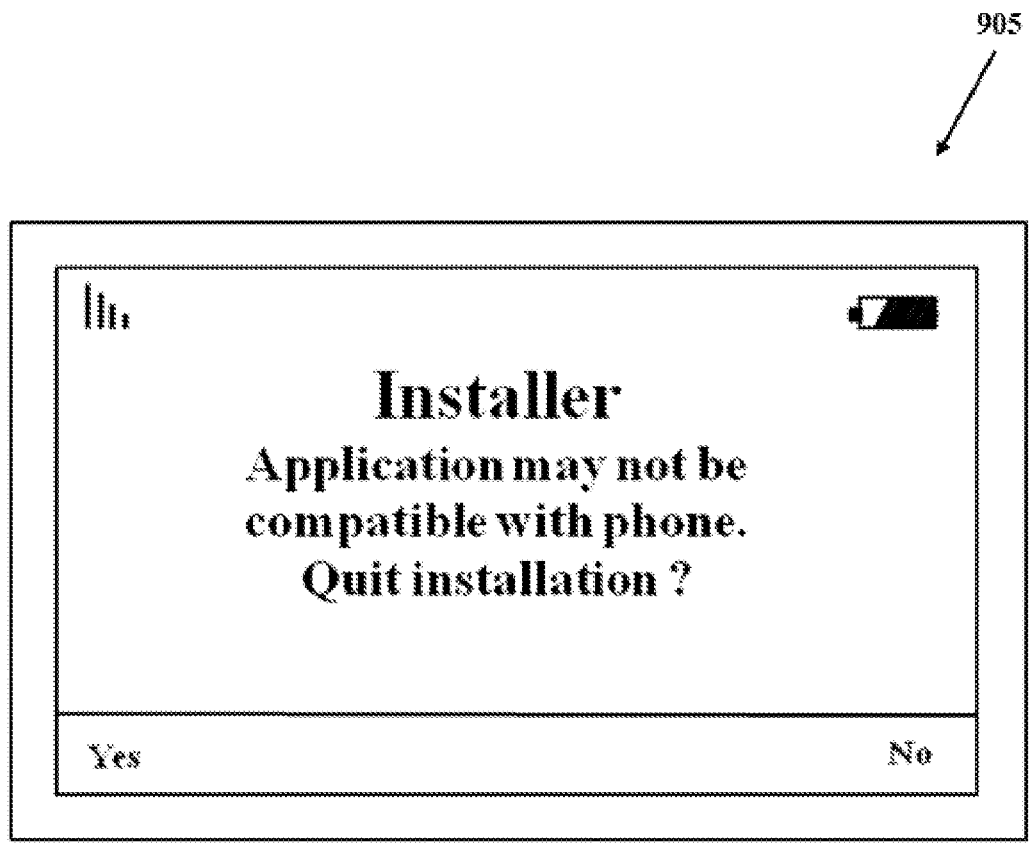

If the CBC application is not compatible with the mobile device 905, the installer pops the message; CBC application not compatible with phone and quit installation as shown in FIG. 9E. In case the user selects "No", the installer installs the application, but the application no longer works. If the user selects "Yes", the installer stops installation and quits from the installation wizard.

Figure 9F:
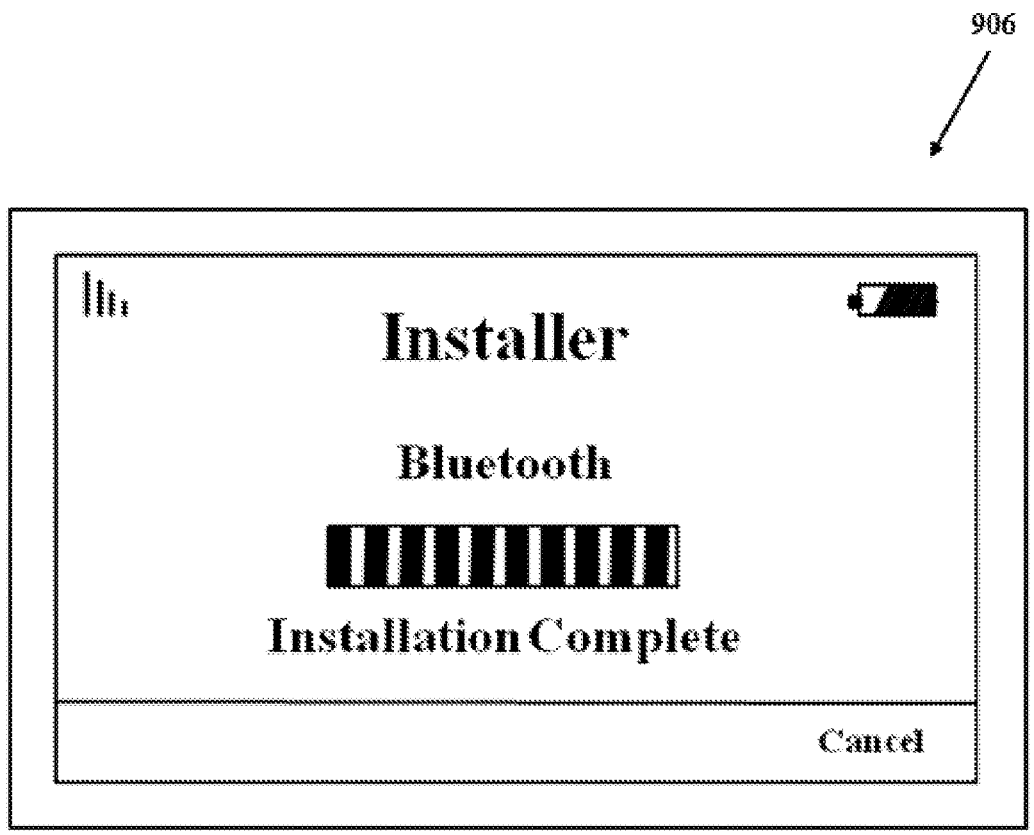

In the fifth step 906 as shown in FIG. 9F the CBC application installs successfully in the mobile device if the CBC application is compatible with the mobile device and the installation complete: message is displayed on the mobile device screen.

FIG. 10 (Utilization of CBS Receiver Module). CBS Receiver modules which are commonly embedded in mobile communication devices, can also be embedded or connected (mobile CBS receiver) to any kind of Monitor Screen or output module—thus allowing such mediums to display advertisements and/or Rich Media Content and/or Clips and/or videos—which are sent via CBS and/or GPRS such as 2.5G, 2.75G (EDGE), 3G and 4G.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A method for transmitting and/or receiving data on a user screen of an electronic device connected to a network, the method comprising steps of:
installing a cell broadcasting system (CBS) application in said electronic device;
uploading data content on a portal;
sending the uploaded data content to a distributing broadcasting system;
shuffling the data contents based on predetermined intervals of usage;
and transmitting the uploaded data content from the distributing broadcasting system to said electronic device, wherein the CBS application provides for receiving and displaying data content on the user screen of the electronic device, and wherein said data content comprises image, text or video data.

2. The method for transmitting and/or receiving data according to claim 1, wherein the step of uploading the data content on the portal comprises steps of:
registering a data content provider with the portal; and
providing authentication credentials, wherein the authentication credentials include a user defined Login-ID and Password.

3. The method for transmitting and/or receiving data according to claim 1, wherein the electronic device is at-least one of GSM mobile communication device and CDMA mobile communication device.

4. The method for transmitting and/or receiving data according to claim 1, wherein the step of uploading the data content is carried out through at least one of a CB media Loader, a CB Media Planner and a CB Media Webpage through a secured network.

5. The method for transmitting and/or receiving data according to claim 1, wherein the uploaded data contents are sorted and saved in a cell broadcast media server of the cell broadcast system or an alternate GPRS medium.

6. The method for transmitting and/or receiving data according to claim 1, wherein the at least one data content is displayed on the user screen in a pattern to cover a display screen, cover a portion of the display screen, replace an operator logo and replace a background picture.

7. The method for transmitting and/or receiving data according to claim 1, wherein the data content is sent to a selected users of a network operator depending on the requirements of at-least one of the user and the data content provider.

8. The method for transmitting and/or receiving data according to claim 1, wherein the
data content is sent to all of the users of the network depending on the requirements of the data content provider.

9. The method for transmitting and/or receiving data according to claim 1, wherein the data content is interactive.

10. The method for transmitting and/or receiving data according to claim 1, further comprising directing the user to additional information related to an data content of interest.

11. The method for transmitting and/or receiving data according to claim 1, wherein additional information is linked to a hyperlink such that the user selects the hyperlink upon area of interest.

12. The method for transmitting and/or receiving data according to claim 1, further comprising transmitting at-least one data content through a wireless application protocol link to the electronic device.

13. A system for transmitting and/or receiving data on an user screen of an electronic device connected to a network, the system comprising:
a cell broadcast manager to receive at least one data content comprising a request from a plurality of cell broadcast entities;
a cell broadcast system to store the at least one data content transmitted by the cell broadcast manager and shuffling the data contents based on predetermined intervals of usage;
a plurality of base station controllers comprising GPRS methodology;
a cell broadcast centreto address an appropriate base station controller for processing the request; and
one or more base transceiver stations for transmitting the uploaded data content to the electronic device, wherein the electronic device includes an user interface for a CBC application installed on the electronic device for receiving and displaying the at least one data content, wherein the at least one data content comprises image, text or video data.

14. The system for transmitting and/or receiving data according to claim 13, wherein the cell broadcast entities defines broadcast areas based on at least one of geographical locations and across geographical locations by abstracting from the topology of a mobile communication network.

15. The system for transmitting and/or receiving data according to claim 13, wherein the cell broadcast entities defines intervals for transmitting the cell broadcast message to the mobile communication device.

16. The system for transmitting and/or receiving data according to claim 13, wherein the cell broadcast message is the data content uploaded to the cell broadcast center.

17. The system for transmitting and/or receiving data according to claim 13, wherein the base transceiver station is a radio base station.

18. The system for transmitting and/or receiving data according to claim 14, wherein said system is adaptable to send and receive SMS and MMS using said system.

* * * * *